Nov. 12, 1935. J. L. BENNETT ET AL 2,020,349
CULINARY UTENSIL
Filed Feb. 21, 1934
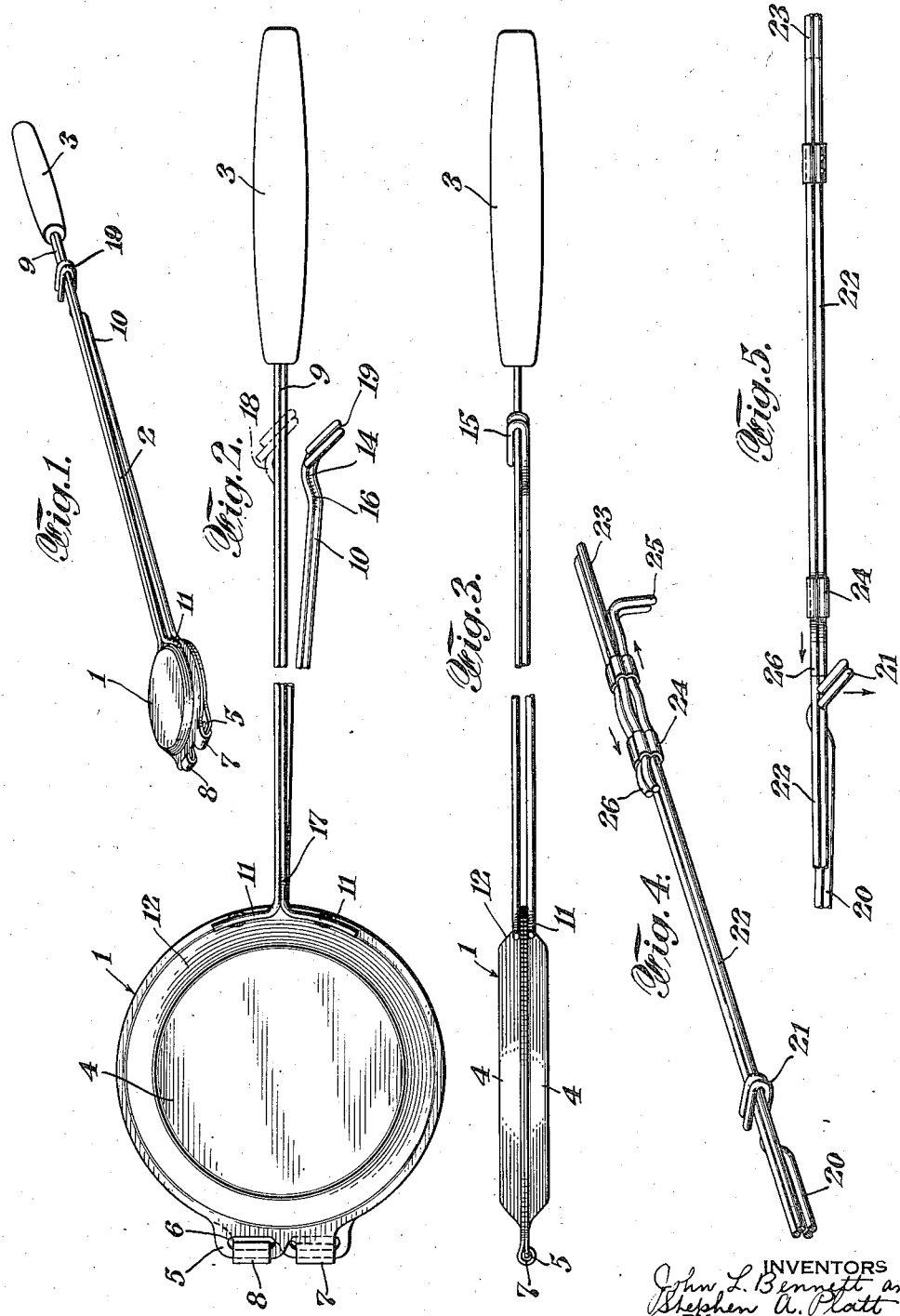
INVENTORS
John L. Bennett and
Stephen A. Platt
BY
Prindle, Bean & Mann
ATTORNEYS Patented Nov. 12, 1935

2,020,349

UNITED STATES PATENT OFFICE 2,020,349

CULINARY UTENSIL

John L. Bennett and Stephen A. Platt, Decatur, Ill., assignors to U. S. Manufacturing Corporation, Decatur, Ill., a corporation of Illinois Application February 21, 1934, Serial No. 712,332

8 Claims. (Cl. 53—7)

This invention relates to improvements in culinary utensils and particularly to cooking devices adapted for grilling, frying, poaching and baking various foods. The objects of the invention will be clear from a study of the following specification, it being understood that various changes from the construction shown in the drawing, may be made in practice without digressing from our inventive ideas as defined by the appended claims.

In the drawing—

Figure 1 represents a perspective view of a complete device embodying our invention.

Figure 2 is a face elevation of the same, part of the handle construction being broken away and different positions of the handle being indicated.

Figure 3 is a side elevation of the device shown in Figure 2.

Figure 4 is a perspective view of part of a modified handle construction including an extensible handle construction and also an automatic tripping feature.

Figure 5 is a side elevation of the construction shown in Figure 4.

Referring now to the drawing the device embodies the utensil which is designated generally by the reference character 1, the elongated handle portion 2 and the gripping element 3. The utensil is preferably in the form of a pair of cupped or dished discs or pans 4 of similar size and shape so that they may be closed down upon each other and form a covered utensil for the purposes specified. In the form shown these discs or pans are circular in shape and are hinged together at their outer end so that they may be closed and opened with respect to each other. The hinge construction includes a lug 5 having a slot or aperture 6 and a projection or flap 7 which is turned or bent upon itself as at 8 to pass through the slot or aperture 6 and to form a closed loop, the slot or aperture providing an eye. In the form shown each disc or pan is provided with a lug 5 and a projection or flap 7 and these parts are so arranged with respect to each other that when the discs are assembled in opposed relation the flap or projection on each disc will cooperate with the slotted or apertured lug on the other disc to form a double hinged construction. By constructing the parts in this manner it is seen that the discs or pans are duplicates of each other and may therefore all be formed by the same stamping or other operation.

The handle member 2 is composed of two parts 9 and 10, the part 9 being composed of a pair of rods or wires to one end of which the gripping element 3 is secured. The other ends of these rods or wires are bent outwardly and curved as at 11 to fit the peripheral flange 12 of one of the discs or pans 4 to which the ends are secured by welding, soldering or other suitable means. The other handle member 10 is also formed of a pair of rods or wires, one of the ends being secured to the other disc or pan in the same manner as described in connection with the handle member 9. This handle member 10 is shorter that the handle member 9 and has its free end formed to provide a grip or catch. This is accomplished by bending said free end as shown to form the locking projection 18 and the transverse open loop 15 (Fig. 3), the bight of the loop being adapted to receive the handle member 9, all as clearly shown in Figures 1, 2 and 3 of the drawing. These handle parts have their wires welded or otherwise secured together at suitable points such as 16, 17, so as to provide a strong, rigid structure and prevent the wires of the handle members from separating. It is of course understood that these handle members are of sufficient resilience to permit proper operation of the parts and that the hinged construction is also loose enough to permit the parts to be easily and readily operated.

It is to be especially noted that the catch 15 (Fig. 3) is located adjacent the gripping element 3 and in position to be readily operated by the thumb or one of the fingers of the user, either in opening or closing.

In order to provide a device which may be adjusted to different lengths we utilize an extensible handle construction which is shown in Figures 4 and 5, the other parts of the device being the same. This extensible handle construction includes three parts, 20 being connected to one disc or pan and being provided with the catch 21 like the catch 15 (Fig. 3) previously described. A second handle member 22 is attached at one end to the other disc or pan and a third handle member 23 is attached at one end to a suitable gripping element such as that shown in Figures 1, 2 and 3 of the drawing. These two handle members 22 and 23 are slidably connected together by means of a plurality of frictional clamps or clasps 24 engaging these members and holding them in slidable frictional contact. The handle member 22 has its free end bent outwardly as at 25 to form a manipulating means or fingerpiece. The inner ends of handle member 23 are exposed as at 26 so that, when the handle parts are contracted, said ends will engage and displace the catch 21 laterally from its engagement with the handle member 22 thus opening the utensil. This arrangement of extensible handle, plus the automatic opening arrangement has various obvious advantages.

This utensil is adapted for various purposes and uses, it is simple in construction, easy to operate, composed of few parts which may be readily manufactured and assembled and are adapted for manufacture on a production basis.

What we claim is:

1. A device of the character described including in combination a pair of circular discs loosely hinged together at one end and each having a handle member secured to it at a part opposite the hinge, each handle member comprising side by side rods whose ends at the related disc are spread apart laterally and are secured to the peripheral portion of the disc to provide an extended bearing or connection therewith and one handle member having a catch to engage the other handle member to hold the parts in closed position.

2. A device of the character described including in combination a pair of circular discs hinged together at one end, each disc being provided with an edge flange, a handle member for each disc, each handle member comprising side by side rods whose ends at the disc are spread apart laterally and have extended bearing against and are secured to the edge flange of the disc or pan.

3. A device of the character described including in combination a utensil composed of two parts adapted to be opened and closed, a handle member for each part, one handle member being provided with a catch for engaging the latter handle member and means associated with the other handle member for releasing said catch.

4. A device of the character described including in combination a utensil composed of two parts and adapted to be opened and closed, a handle member for each part, one handle member being provided with a catch for engaging the other handle member and extensible means associated with the latter handle member for automatically releasing said catch.

5. A device of the character described including in combination a utensil composed of two parts adapted to be opened and closed, a handle member for each part, one handle member being bent sidewise and then upon itself to form a lateral projection and also an open loop extending transversely relatively to the long axis of the other handle member, said open loop portion of said handle member being adapted to frictionally engage the other handle member to hold the parts of the utensil in closed position.

6. A device of the character described including in combination a utensil composed of two parts adapted to be opened and closed, a handle member for each part, one handle member being bent sidewise and then upon itself to form a lateral projection and also an open loop, said open loop portion of said handle member being adapted to frictionally engage the other handle member to hold the parts of the utensil in closed position, said other handle member being provided with extensible means adapted to engage the open loop when moved in one direction to release its engagement with the handle member.

7. A culinary utensil including in combination a pair of circular discs each disc being a duplicate of the other and having a circular pan portion with a flat extremital flange portion of one disc, the flange portion being formed with complementary hinged parts severally adapted to cooperate with duplicate hinged parts on the other disc to provide a hinged connection between the discs, whereby the two discs and their hinge parts are identically the same.

8. A culinary utensil including in combination a pair of circular discs each disc being a duplicate of the other and having a circular pan portion with a flat extremital flange portion, the flange portion being formed with complementary hinged parts adapted to cooperate with duplicate hinged parts on the other disc to provide a hinged connection between the discs, and a wire handle member for each disc having laterally extending portions curved to correspond to the curvature of the flange of the disc and secured thereto by means of said curved laterally extending part.

JOHN L. BENNETT.
STEPHEN A. PLATT.

CERTIFICATE OF CORRECTION.

Patent No. 2,020,349.                                      November 12, 1935.

JOHN L. BENNETT, ET AL.

It is hereby certified that error appears in the printed specification of the above numbered patent requiring correction as follows: Page 2, first column, line 36-37, claim 3, for "latter" read other; and line 38, same claim, for "other" read latter; and that the said Letters Patent should be read with these corrections therein that the same may conform to the record of the case in the Patent Office.

Signed and sealed this 18th day of February, A. D. 1936.

Leslie Frazer (Seal)                                          Acting Commissioner of Patents.